United States Patent Office 3,637,842
Patented Jan. 25, 1972

3,637,842
PERFLUORO POLYETHER ACYL FLUORIDES
T. O. Paine, Acting Administrator of the National Aeronautics and Space Administration, with respect to an invention of Eugene C. Stump and Stephen Eugene Rochow, Gainesville, Fla.
No Drawing. Filed Oct. 24, 1968, Ser. No. 770,425
Int. Cl. C07c 5/58
U.S. Cl. 260—544 F
2 Claims

ABSTRACT OF THE DISCLOSURE

Perfluoro polyethers having the formula:

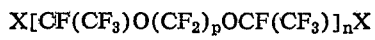

where
$n$ is an integer of from 2 to 12,
$p$ is an integer of from 2 to 23, and
$X$ is selected from the group consisting of

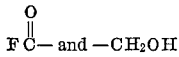

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

(1) Field of the invention

This invention is in the field of new polymers. More particularly, the invention relates to polymeric materials comprised of perfluorinated polyethers which can subsequently be cross linked to form useful products.

(2) Description of the prior art

Highly fluorinated polymers are of particular interest because they tend to possess outstanding chemical resistance and non-flammability. These properties are attributed mainly to the presence of the fluorine atoms in the polymer chain. As a result, polymers that are perfluorinated will possess a maximum of the aforegoing properties.

There is disclosed in U.S. Pat. 3,250,807 fluorocarbon ethers which have the general formula

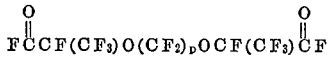

where $p$ is an integer of from 2 to 23.

That patent disclosed utilization for these ethers as chemical intermediates. As indicated therein, the materials would have outstanding thermal and chemical properties when utilized as dispersing agents and the like. Further, the patent indicated that due to the particular end group structure, i.e.,

the materials could be decarboxylated to result in vinyl ethers which would have utility as monomers in the formation of thermosetting resins. In other words, the prior art referring to the ether materials appreciated only the formation of addition type polymers resulting from the decarboxylation process. Obviously, in such resulting monomers the carboxyl end grouping must disappear.

OBJECT OF THE INVENTION

The object of this invention is to provide new polymer or prepolymer perfluorinated polyethers terminated with either acid fluoride or hydroxy termination.

SUMMARY OF THE INVENTION

This invention concerns novel prepolymer materials having the general formula:

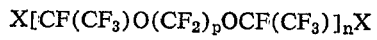

where
$n$ is an integer of from 2 to 12,
$p$ is an integer of from 2 to 23, and
$X$ is selected from the group consisting of

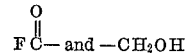

These materials are derived by utilizing a starting ether wherein $n$ in the aforegoing formula would be equal to 1, and X is the acid fluoride group. This diacid fluoride perfluoroether is then subjected to ultraviolet radiation whereupon a photochemical coupling occurs to create a resulting product with an acid fluoride termination and $n$ being from 2 to 12. To obtain the hydroxy terminated version of the prepolymer, the resultant acid fluoride terminated perfluoro polyether resulting from the ultraviolet radiation is then reacted with either aluminum hydride or alkali metal borohydride to cause a reduction reaction to occur resulting in a hydroxy terminated prepolymer.

DESCRIPTION OF THE PREFERRED EMBODIMENTS

The starting fluorocarbon ethers utilized to form the polymers of this invention are obtained by the reaction of diacid fluorides with hexafluoropropylene epoxide as described in the aforementioned Pat. 3,250,807. As has been further indicated, the starting perfluoroethers utilized to form the products of the herein invention are acid fluoride terminated. These particular acid fluoride terminated materials may be prepared from the reaction of perfluoroglutaryl fluoride and hexafluoropropylene epoxide. Examples of other suitable fluorides include oxalyl fluoride and perfluoromalonyl difluoride.

The herein polymerization of the acid fluoride terminated perfluoroethers occurs by elimination of a

group and recombination of radicals. Carbon monoxide and carbonyl fluoride are products of the reaction as seen below.

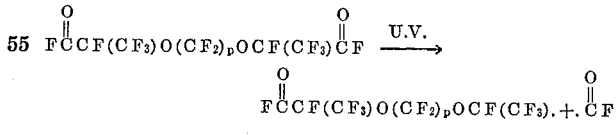

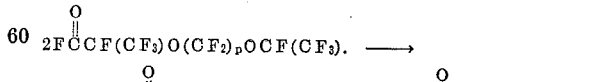

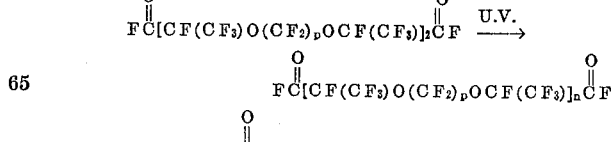

where $n$ and $p$ are as defined above.

The molecular weight of the polymers formed is dependent upon (1) the purity of the starting ether material, (2) the time of the irradiation, and (3) the wattage and spectrum of the UV source. As can be expected, in a given polymerization, various fractions of different molecular weights are normally obtained. Since these are prepolymers that are being formed, it is desirable that they be in the form of viscous liquid that can be readily handled and mixed with other materials to effect a cross linking or complete polymerization. Thus, it is preferred to obtain polymers where $n$ in the aforegoing formula pertaining to the herein polymers is equivalent to between 2 and 4 to give a molecular weight ranging from about 1200 to about 2300. Thus, for a starting ether having a given purity, one may through an empirical process obtain the aforegoing molecular weight range by varying the time of irradiation and, if needed, the type or wattage of the UV source. As will be shown in the specific examples, satisfactory products have been obtained through irradiation utilizing a 450 watt UV source and exposure for four days.

Continued irradiation will produce, over a longer period of time, a solid infusible material which is a very high molecular weight polyether structure. This resulting solid product, of course, can be successfully utilized as a complete end product material of the herein invention. Additionally, the viscous prepolymers formed could be subsequently applied as a coating and the like and then subjected to further irradiation to cause a continued polymerization forming the solid product. Of course, the prepolymers additionally can be reacted with other materials to cause extension and cross linking reactions to occur producing end polymers. It is of interest to note that the viscous fluid polymers in the weight range of 1500 to 2000 molecular weight are soluble in material such as Freon 113, while no solvent has been found for the higher molecular weight solid polymer materials resulting from the herein invention.

To further enhance the polymerization ability of the prepolymers formed in accord with this invention, the acid fluoride end groups

can be converted to hydroxy groupings through the reduction of the material with strong reducing agents such as lithium aluminum hydride and sodium borohydride. The reaction is carried out by dissolving the acid fluoride terminated polyether in a suitable solvent, such as Freon 113, followed by addition to the reducing agent in a solvent such as diethylene glycol dimethyl ether. All materials should be anhydrous to prevent hydrolysis of the acid fluoride group. The amount of reducing agent required is determined by the stoichiometry of the reaction, such that there is sufficient hydrogen present from the reducing agent to cause the transformation of the acid fluoride group to the hydroxyl group. Thus, for example, with sodium borohydride, a mole ratio of the borohydride to the diacid fluoride terminated polyether of at least 1:1 is utilized. Likewise, a mole ratio of at least 1:1 is used for the lithium aluminum hydride to the polyether. It is interesting to note that the reaction to form the diol from the acid fluoride will occur utilizing lithium aluminum hydride, since it has been reproted that this reducing agent will not serve to reduce a monoacid fluoride version of the polyether utilized.

It is believed that the invention will be further understood from the following detailed examples:

Example I

This example demonstrates the preparation of the initial starting acid fluoride terminated perfluoro ether utilized. 21 grams of cesium fluoride was heated overnight at 110° C. in a 500 milliliter Fisher-Porter bottle under vacuum. Dry distilled diglyme was added to the bottle in the amount of 200 milliliters. During the addition of the diglyme, heat was evolved as the solid partially dissolved. 175 grams or .718 mole of perfluoroglutaryl fluoride was then added with evolution of heat. The solution had a milky appearance at this point. The container was then cooled in ice water and 245 grams or 1.478 moles of perfluoropropylene epoxide was added, such that a pressure of 5 to 8 p.s.i.g. was maintained in the container. The pressure was maintained by a Matheson Model 71A low pressure regulator. After addition was completed, two layers were observed. The lower layer was separated and distilled. The two major fractions were obtained at 107.5–109.5° C. and 72–73°/33 mm. mercury. The lower boiling fraction was identified as the 1 to 1 product

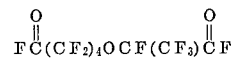

and the higher boiling fraction as the 2 to 1 product

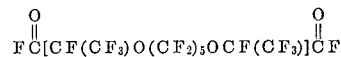

The conversion to the two acid fluorides were 24 and 41 percent respectively. The 2 to 1 product was utilized as the starting material to form the polymers of this invention.

Example II 260 grams or .452 mole of

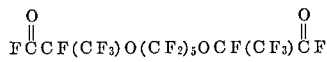

was added to a reactor which was comprised of a Pyrex tube with a gas outlet and a single 60/50 neck into which a 7910 Vycor immersion well was placed. The working volume in the reactor was about 175 ml. A 450 w. Hanovia C79A-36 ultraviolet lamp was placed in the well which was cooled by a water jacket. The reactor was vented through a LOX cooled finger trap. The diacid fluoride starting material was irradiated for four days. During this period the liquid visibly thickened and a small amount of solid polymer appeared. Unreacted starting material, which amounted to 55 grams, was removed from the liquid by distillation leaving 163 grams of polymer having the structure

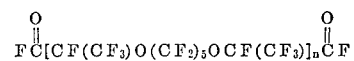

Molecular weight by neutralization equivalent was 2225 where $n$ would thus be about 4. An infrared spectrum of the product obtained exhibited a distinctive peak at 5.3 microns, attributed to the

group. The small quantity of the solid insoluble polymer obtained did not burn when placed in a gas-oxygen flame.

Example III 222 grams or .386 mole of

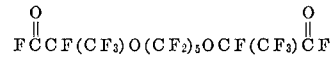

was placed in the reactor described in Example II and irradiated for four days in accord with the method described. During this period a clear solid polymer formed on the glass surface nearest the lamp, while the liquid base became noticeably more viscous. Both carbonyl fluoride and carbon monoxide were found in the trap. The solid material was isolated by centrifugation and extracted with Freon 113, $CF_2ClCFCl_2$. After drying, a clear gummy elastomeric polymer remained as a minor product of the reaction. The liquid phase was distilled giving 21 grams of starting material and 57 grams of a low polymer boiling from 95° C./42 mm. to 171° C./35 mm. of mercury. The highest boiling fraction had a neutralization equivalent of 300 corresponding to a molecular weight of 1200 where $n$ is equal to about 2. Most of this material, which was about 100 grams, boiled too high to be easily distilled and constituted the major product of the reaction. The neutralization equivalent was 370 corresponding to a molecular weight of 1480 indicating the structure

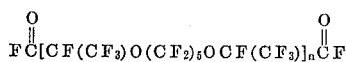

where $n$ is equal to about 3. It is noted that essentially the same procedure was followed in this example as in Example II, yet the resulting product had a significantly lower molecular weight yet easily within the desirable range. The difference in molecular weight is believed attributable probably to the purity of the starting material. The starting acid fluoride terminated material in this example was most likely of a lower purity than that utilized in Example II, thus providing a lower molecular weight polymer product.

Example IV

In this example, the polymer product as prepared in Example II or III was hydroxy terminated. In order to accomplish this, a 500 milliliter, 4-neck flask was equipped with a thermometer, stirrer, condenser and addition funnel. The glassware was dried by a flame under nitrogen purge. 50 grams of dry diethylene glycol dimethyl ether was utilized as a solvent and 4 grams or .106 mole of sodium borohydride were added. 50 grams or .039 mole of

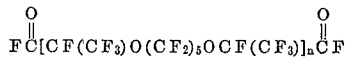

having a molecular weight of 1294 was dissolved in 50 grams of Freon 113, and slowly added with stirring to the solution in the flask. During the addition the temperature of the flask was maintained between 60° and 70° C. Upon completion of the addition, the mixture was heated to 85° C. and kept at that temperature for 20 hours. The mixture was then cooled and water added slowly keeping the tempearture below 75° C. Moreover, an additional 200 milliliters of water was added and the mixture was heated to 80° C. for 20 hours. The lower layer which formed was separated. The upper layer was extracted 3 times with ethyl ether. The organic layers were combined and ether removed, leaving 47 grams of

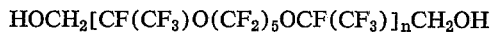

having a molecular weight of 1740 by end group analysis. The difference in molecular weights between the starting material and the product obtained is attributed to experimental error in determinations. An infrared spectrum of the product disclosed typical hydroxy group absorption at 3 microns. The product was essentially free of carboxylic acid groups as was evidenced by the lack of infrared absorption at 5.7 microns and by an acid number of .015.

The two products of this invention, that is, the acid terminated and the hydroxy terminated perfluoropolyethers can be utilized as prepolymers to form expulsion bladder materials, seals, O-rings, gaskets and lines conveying oxidizers and fuels, non-flammable coatings for spacecraft use, and other similar space applications. Further utilization of the materials can be found in the formation of polymers for hoses for use at low temperatures, adhesives for use in contact with corrosive environments, potting and encapsulating compounds and conformal coatings. The advantage of the materials of the type of this invention is two-fold. First, these materials are completely fluorinated, thus imparting good chemical resistance and non-flammability to polymers prepared from them. Second, the presence of the ether linkage in the backbone of the chains contributes to good low temperature flexibility.

What is claimed is:

1. 
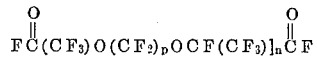

where $n$ is an integer of from 2 to 12, and $p$ is an integer of from 2 to 23.

2. The polyether of claim 1 where $p$ is 5.

References Cited

UNITED STATES PATENTS 3,250,807    5/1966    Fritz _____ 260—535

LORRAINE A. WEINBERGER, Primary Examiner

E. JAY GLEIMAN, Assistant Examiner

U.S. Cl. X.R.

204—159.11; 260—78.3, 615 BF

UNITED STATES PATENT OFFICE
CERTIFICATE OF CORRECTION

Patent No. 3,637,842                    Dated January 25, 1972

Inventor(s) Eugene C. Stump and Stephen Eugene Rochow

It is certified that error appears in the above-identified patent and that said Letters Patent are hereby corrected as shown below:

Column 4, lines 15 to 17, the formula should appear as follows:

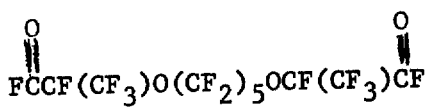

Column 5, line 36, "tempearture" should read -- temperature --.
Column 6, lines 26 to 28, the formula should appear as follows:

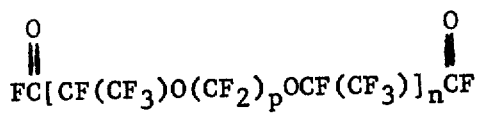

Signed and sealed this 18th day of July 1972.

(SEAL)
Attest:

EDWARD M. FLETCHER, JR.            ROBERT GOTTSCHALK
Attesting Officer                   Commissioner of Patents